HARRY PUTTERMAN
INVENTOR.
by S. A. Giarratana
F. L. Masselle
George B. Oujevolk
ATTORNEYS HARRY PUTTERMAN
INVENTOR.
by S. A. Giarratana
F. L. Masselle
George B. Oujevolk
ATTORNEYS HARRY PUTTERMAN
INVENTOR.
by S. A. Giavratana
F. L. Masselle
George B. Oujevolk
ATTORNEYS HARRY PUTTERMAN
INVENTOR.
BY S. A. Giarratana
F. L. Masselle
George B. Oujevolk
ATTORNEYS HARRY PUTTERMAN
INVENTOR.
S. A. Giarratana
BY F. L. Masselle
George B. Oujevolk
ATTORNEYS United States Patent Office 3,428,958
Patented Feb. 18, 1969

3,428,958

NON-DESTRUCTIVE READ-OUT MEMORY AND CONSTANT CURRENT DRIVER

Harry Putterman, Elizabeth, N.J., assignor to General Precision Systems Inc., a corporation of Delaware Continuation-in-part of application Ser. No. 450,346, Apr. 23, 1965. This application Sept. 24, 1965, Ser. No. 489,997
U.S. Cl. 340—174 2 Claims
Int. Cl. G11b *5/00*

This application is a continuation-in-part of the Harry Putterman U.S. Patent application Ser. No. 450,346 filed Apr. 23, 1965.

The present invention relates to a solid state, high speed, low power, low cost and high reliability non-destructive read-out (NDRO) memory for the execution of one or more programs. More particularly, the presnt invention relates to a system making use of a plurality of standard square loop ferrite cores, that are selectively wired-in into a memory stack and which, when connected together with the electronic arrangement contemplated herein, form a NDRO memory storing one or more programs.

Storage of a computer program on a plurality of magnetic cores is well known in the art and has been discribed in numerous textbooks, e.g., R. K. Richards, "Digital Computer Components and Circuits," D. Van Nostrand Company, Inc., 1957 edition, chapter 8. One bit of information, i.e., a "1" or a "0" is stored on each core and can be supplied by the core in a write-read sequence by a matrix of X and Y wires passing across the cores, each wire carrying a current of $I/2$. A current of $I/2$ is insufficient to enable a core which will only be enabled by a current value of I or the intersection of two wires carrying current of $I/2$. The stored information is then read out by a third wire winding known as the sense winding. With this arrangement the stored information or program is destroyed by one write-read sequence.

While this type of ferrite core arrangement has found general acceptance in the destructive read out (DRO) memories of the modern data processor, no reliable low cost element for use in the NDRO memories has been thus far provided in actual practice. It is, indeed, difficult to find two computer systems, made by different manufacturers, that use the same or similar NDRO memories. Thin film, Transfluxor, and the Biax are some of the magnetic elements that have found application in NDRO memories. These memories, however, are neither economical in price because of their high cost/bit (20–30¢ without electronics) nor are they economical in electronic parts because of the "word organized mode" of operation they necessitate. These memories are electrically alterable, i.e., their stored information can be altered electrically at the expense of write-in electronics.

The search for high reliability in airborne processing equipments has led, in recent years, to the wired-in memory which is inherently non-alterable electrically. The Apollo computer for example uses a core-rope memory designed by MIT, and the IBM–360 series uses a transformer type memory.

Of the two, the core-rope has found more acceptance in airborne application because of the relatively low component count. It is, nonetheless, not very reliable from the operational point of view because of the noise generated by the multitude of current pulses required for interrogating the core-rope. A 512 word memory, for example, requires the coincidence of 9 currents. The memory also requires the threading of $(20+n)$ wires through its cores for selection and sensing where $n$ is the number of bits. The size of the core-rope memory is, therefore, held down to 512 words and its speed is relatively low 50–100 kilocycles.

The memory of the present invention suffers from no such limitations. Its size may be as large as that of standard DRO memories or about 16,000 words and its speed, because of its read-only mode of operation, may be twice as fast as that of DRO memories (read/write required) or 2–3 megacycles. Furthermore, the component count and power are substantially less than that required for a DRO memory and the cost/bit is less. The memory can also be used for storing more than one program and, thereby, further reducing the cost/bit.

This capability of multi-program storage is of great advantage in flight control systems where the program is made dependent on the flight condition for optimum control and/or stabilization. The memory requires the threading of 4 wires for the storing of one program and one additional wire for each additional program. Therefore, an object of the present invention is to provide a NDRO memory with a high storage capacity.

Another object of the present invention is to provide a NDRO memory which can be readily manufactured or assembled and where any program stored therein can be readily changed with little labor.

With the foregoing and other objects in view, the invention resides in the novel arangement and combination of components and in the details of construction hereinafter described, it being understood that changes in the precise embodiment of the invention herein disclosed may be made within the scope of what is described without departing from the spirit of the invention.

The advantages of the invention will become apparent from the following description taken in conjunction with the accompanying drawing in which.

FIGS. *4a* and *4b* show schematically the reset current patterns for sequential and random access read out and restoration of memory.

Figure 5:
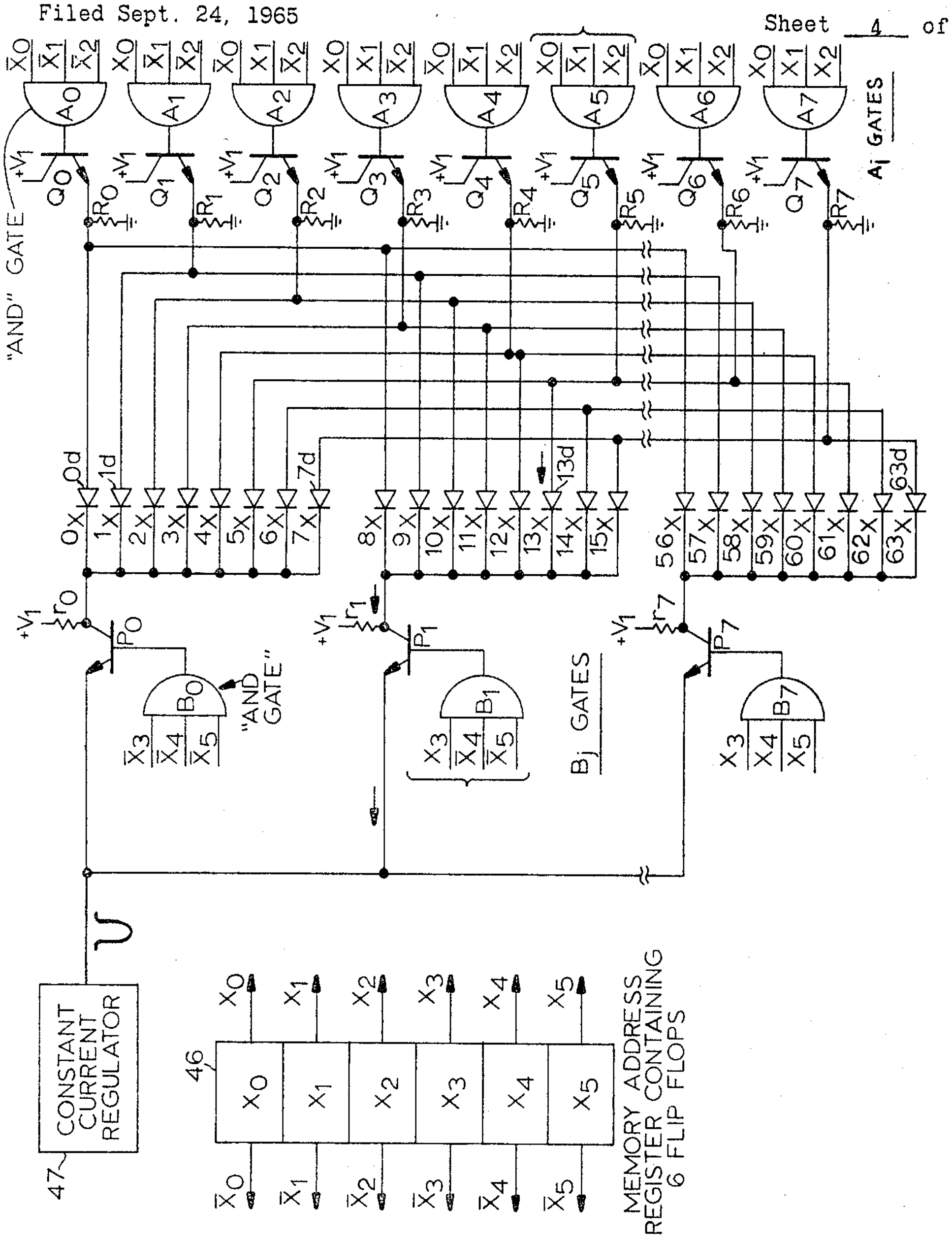
Figure 6:
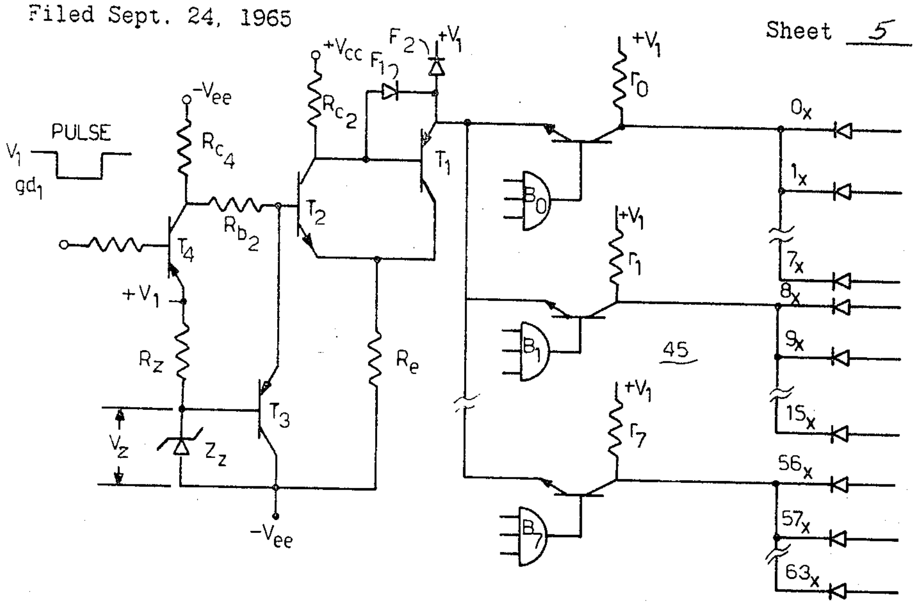
Figure 7:
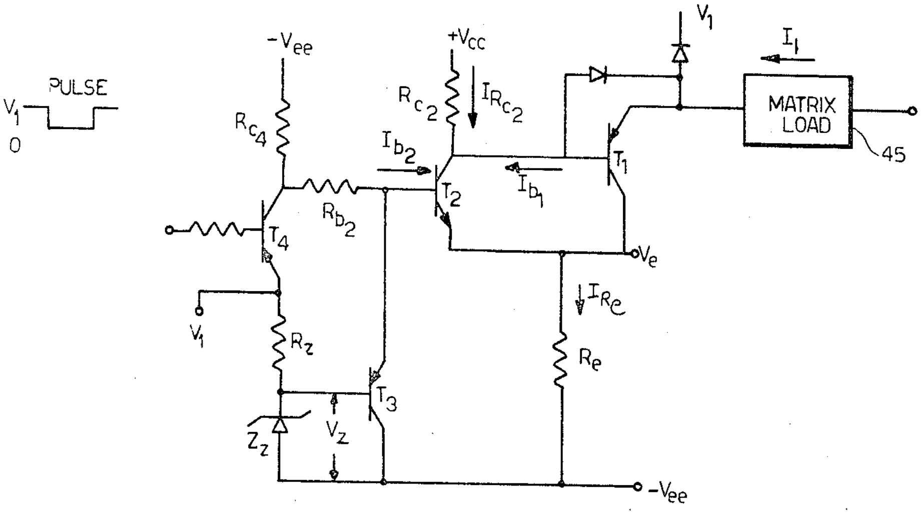

FIG. 5 is a schematic explanation of the selection matrix used in connection with the memory contemplated herein;

FIG. 6 illustrates schematically in greater detail a portion of the matrix of FIG. 5; and FIG. 7 repeats most of the schematic diagram of FIG. 6, providing symbols used in the mathematical explanation thereof.

Generally speaking, the memory system contemplated herein operates in a coincident current mode, i.e., coincidence of two currents, $x$ and $y$, is required to read out any word from the memory. All the bits, i.e., cores of the words are read out in parallel. During read-out the cores storing "1" 's switch to "0" state producing outputs on their respective sense lines. The state of the cores storing "0" 's are unaffected in the process and, therefore, produce no signal output. Following read-out all "1" cores are reset to their original "1" state. Again, the "0" cores are unaffected. This is accomplished by passing the reset winding through the "1" cores and bypassing the "0" cores. This is illustrated in FIG. 1 for a single core and in FIG. 2 for a 16 word $n$ bit memory.

Figure 1:
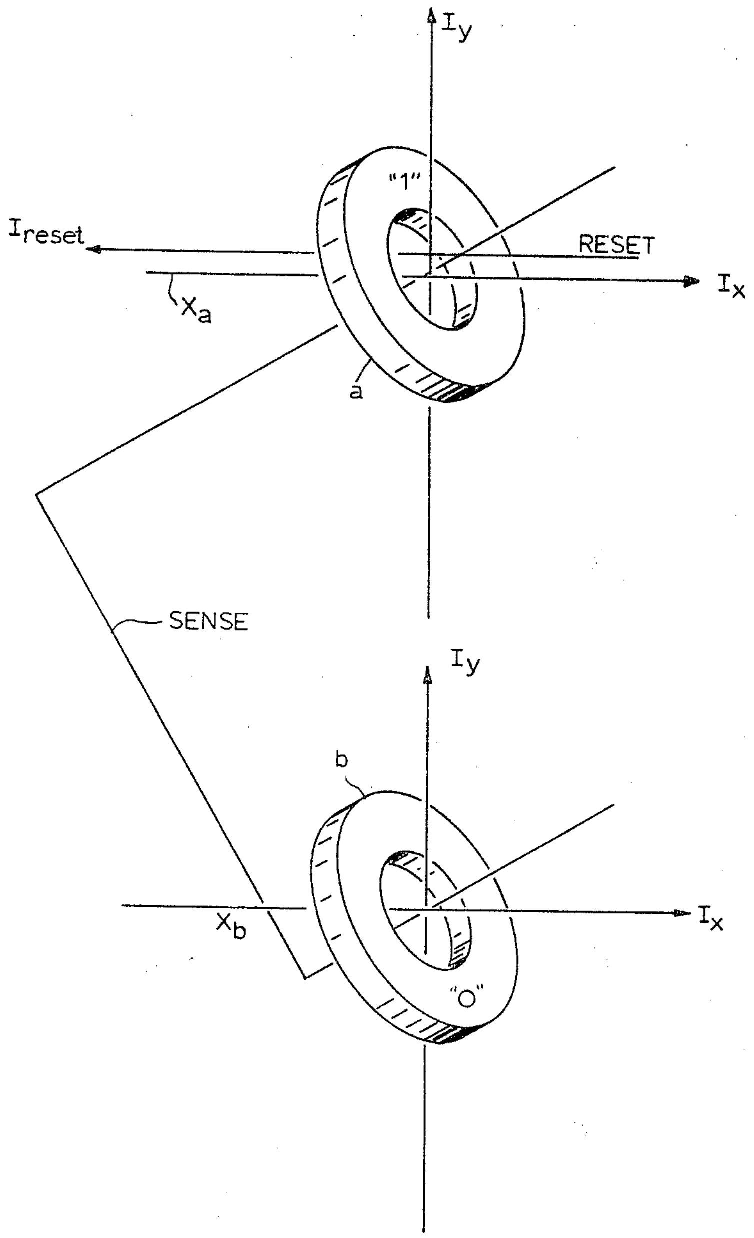
FIG. 1 is a schematic explanation of the basic theory of the memory contemplated herein.

The general pattern of operation is illustrated in FIG. 1 for a program having one "1" and one "0." The memory consists of two cores $a$ and $b$. The "1" is stored on core $a$ while the "0" is stored on core $b$. Passing through the cores is an $x$-$y$ matrix, which in this case consists of winding $x$, $x_a$ and $x_b$ in the $x$-plane and winding $y$ in the $y$ plane. There is also a sense winding (so labeled for simplicity) and a reset winding (also so labeled for simplicity).

As in the conventional DRO type of memory, if a "1" is stored in core $a$, during the "write" sequence, because of the coincidence of windings $x_a$ and $y$, during the "read" sequence, core $a$ will be sensed as a "1" by the sense winding, but the "1" is destroyed in the read-out, converting the "1" to a "0." However, core $a$ has something that core $b$ does not have, namely a reset winding, and after the program is completed, i.e., after both cores $a$ and $b$ have finished the "read" sequence, a reset pulse is passed through the reset winding to restore core $a$ to the "1" state. The reset winding, however, does not pass through all the cores but only through the cores which call for a "1" according to the program. Thus, the program is sequentially repeated.

The entire memory or any one bit of the memory can store more than one program by simply adding another reset winding and an ancillary driver for each additional program. This is illustrated by the two programs of bit plane "$n$" in FIG. 2. To read-out a given program the corresponding reset driver is enabled and pulsed before each read-out for random access operation or once before the sequential read-out of the entire program.

Figure 2:
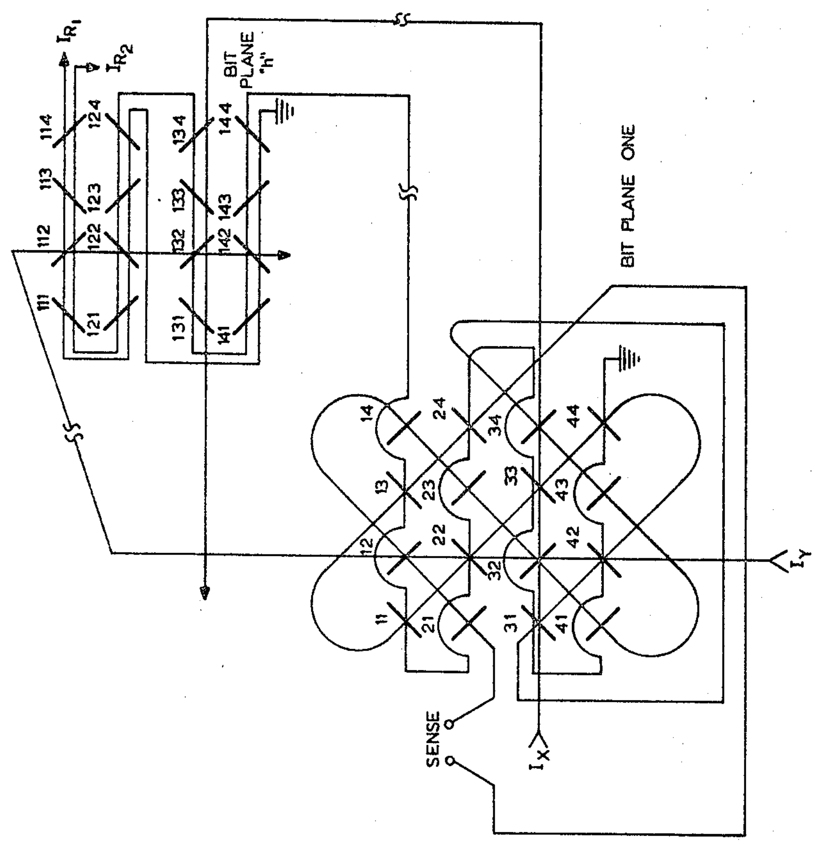
FIG. 2 shows a wiring pattern for a memory utilizing the concept explained in FIG. 1.

In FIG. 2, only one $x$, one $y$ and one sense winding in bit plane one are shown for the sake of clarity. Here, bit plane one is wired for alternate "1" 's and "0" 's and bit plane "$n$" for all "1" 's for a first program controlled by $I_{R_2}$ and an arbitrary pattern of "1111111100001111" for a second program controlled by $I_{R_1}$. Thus, in bit plane one, having cores 11, 12, 13, 14, 21, 22, 23, 24, 31, 32, 33, 34, 41, 42, 43, 44, the reset winding $I_{R_2}$ passes only through cores 13, 11, 22, 24, 33, 31, 42, 44. In bit plane "$n$," reset winding $I_{R_2}$ passes through all the cores 111 to 144 whereas winding $I_{R_1}$ does not pass through cores 131, 132, 133 and 134.

Figure 3:
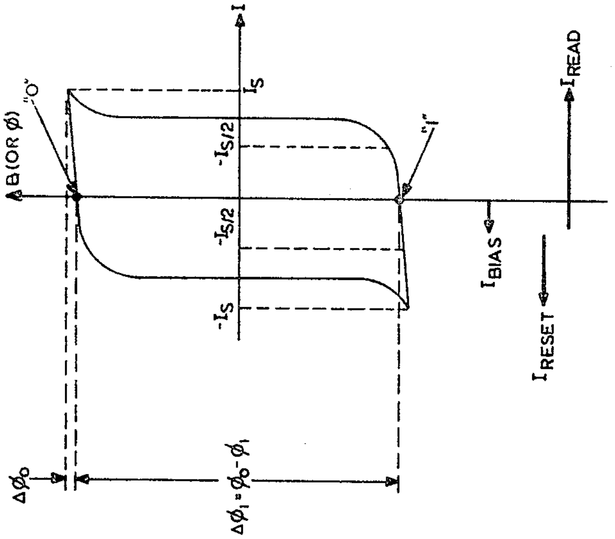
FIG. 3 depicts a hysteresis loop for the cores of the memory explained in FIG. 1.

To minimize the noise output resulting from "half-selected" "1" cores, a D-C bias current is made to flow in the reset windings, shown in FIG. 3. The cores numbered 42, 22, 12, 31, 34 and 33 of bit plane one and cores numbered 142, 122, 112, 131, 133 and 134 of bit plane "$n$" are "half-selected" by either the $x$ or the $y$ current. If this bias current is made equal to ⅓ of the full switching current, or $-I_s/3$, and the $x$-$y$ currents to $+⅔\ I_s$, the "half-selected" cores will only be affected by ⅓ $I_s$. The noise output under these conditions will, because of the non-linear properties of the cores, be drastically reduced.

It should be noted that the "half-selected" noise is present in conventional DRO memories. The useful signal to noise ratio is, nevertheless, still acceptable if the tempertaure range is limited and the half-select currents are accurately controlled.

In the present invention as represented in FIG. 3 illustrating a typical hysteresis loop similar to that shown in the aforementioned book by R. K. Richards, on page 375 there is an I bias D-C current flowing through the core. The loop, as in most cases, is not perfectly rectangular, although the "1" and "0" are shown centered at the "top" and "bottom" of the rectangle. In practice, the "1" and "0" occupy other theoretical "locations"; this is technically known as a disturbed "1" or "0" state and causes the noise in the circuit. By raising the operational level, the noise is reduced or controlled within reasonable limits. The bias current improves the signal to noise ratio and, thus, serves to extend the temperature range and/or reduce the accuracy requirements of the constant current drivers. Operation over the temperature range of $-55°$ C.–125° C. is, therefore, possible without temperature compensation.

Figure 4A:
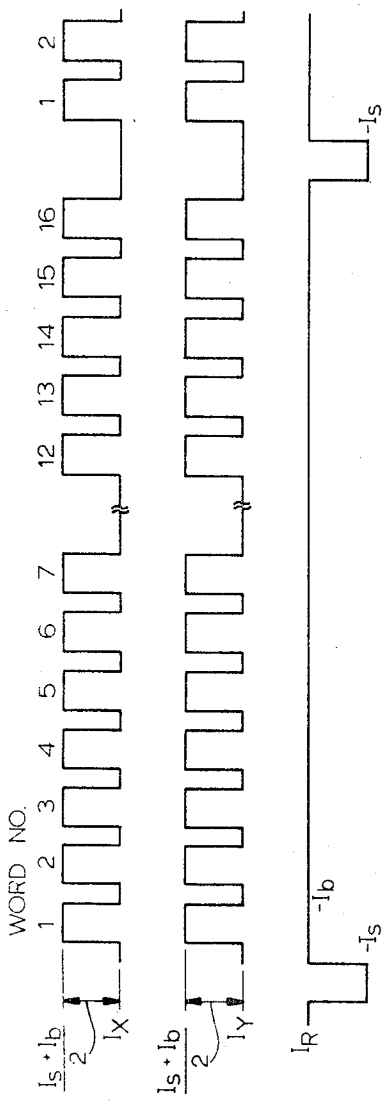
Figure 4B:
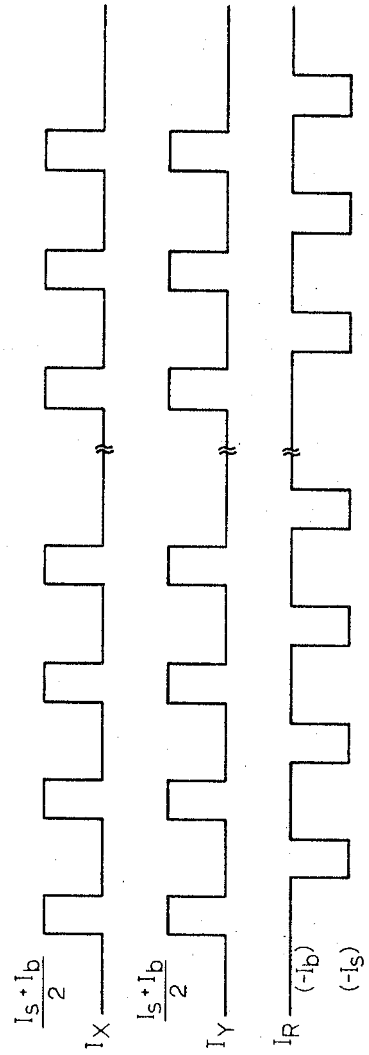

The $x$-$y$ and reset current patterns required for random-access and sequential operation are shown in FIGS. 4$a$ and 4$b$, respectively. In the sequential mode a read-out of a given program is accomplished in less than one-half the time required for the read-out in the random-access mode as could be noted from FIGS. 4$a$ and 4$b$. For the programming point of view, however, the random access mode is, of course, more flexible.

The component count for the NDRO memory described above is much lower than that required for a conventional DRO ferrite core, coincident current memory. The latter is, incidentally, the most economical of all solid state memories presently available. To read and restore information stored in a DRO memory of $M^2$ words of $n$ bits, each of the following components are required: 8M diodes, $4\sqrt{M}$ drivers, $4\sqrt{M}$ sinks, 4 ($x$-$y$) constant current regulators and $n$ constant current bit drivers. All these must be capable of handling 200–400 ma. depending on the speed required. The NDRO memory, disclosed herein, requires only 2M diodes, $\sqrt{M}$ drivers, $\sqrt{M}$ sinks, 2 ($x$-$y$) constant current regulators and no bit drivers. Instead of the bit drivers, one reset driver is required. The reduction in components could best be demonstrated by a comparison of the two memories each consisting of 4096 (=64 x 64) words x 10 bits.

| | Conventional DRO | NDRO |
|---|---|---|
| Diodes | 512 | 128 |
| Drivers | 32 | 8 |
| Sinks | 32 | 8 |
| Regulators | 4 | 2 |
| Constant current bit drivers | 10 | 0 |
| Reset driver | 0 | 1 |

The power dissipated in a NDRO memory is also much lower. For 10 bit drivers alone, for a 2 microsecond memory, require about 12 watts (=10 x 300 ma. x 12 volts x 35% duty cycle).

To select any one particular core in a memory, e.g., a memory having 4096 (64 x 64) words by 10 bits, a selection matrix 45 is used, and such a selection matrix 45 is shown in FIG. 5 for the selection of one of the sixty-four $x$ lines $0_x$ to $63_x$. Another identical matrix is required for the selection of the sixty-four $y$ lines.

The $x$ selection matrix 45 has a memory address register 46 containing in this case six flip-flops labeled $x_0, x_1, x_2, x_3, x_4, x_5$. Each flip-flop has two sides, a "one" and a "zero" side, the output on the zero side being represented by a bar over the flip-flop designation, i.e., $\bar{x}_0$ meaning not $x_0$. For a given address contained in the $x$ address register, two AND gates will be enabled, an $A_i$ gate and a $B_j$ gate. If, for example, the address is $x_0\ \bar{x}_1\ x_2\ x_3\ \bar{x}_4\ \bar{x}_5$ the gates $A_5$ and $B_1$ are enabled. Each AND gate is a transistor, i.e. transistors $P_0, P_1 \ldots P_7$ are used for AND gates $B_0, B_1 \ldots B_7$, while transistors $Q_0, Q_1, Q_2 \ldots Q_7$ are used for AND gates $A_0, A_1, A_2 \ldots A_7$. The AND gates each require three inputs in accordance with a predetermined logic arrangement known in the art and briefly illustrated in FIG. 5. Thus, AND gate $B_0$ has inputs $\bar{x}_3\ \bar{x}_4\ \bar{x}_5$; AND gate $B_1$ has inputs $x_3\ \bar{x}_4\ \bar{x}_5$; AND gate $B_7$ has inputs $x_3\ x_4\ x_5$; AND gate $A_0$ has inputs $\bar{x}_0\ \bar{x}_1\ \bar{x}_2$; AND gate $A_1$ has inputs $x_0\ \bar{x}_1\ \bar{x}_2$; AND gate $A_7$ has inputs $x_0\ x_1\ x_2$. Each AND gate is enabled only when the three input signals are provided. For the address $x_0\ \bar{x}_1\ x_2\ x_3\ \bar{x}_4\ \bar{x}_5$, among the $A_i$ gates a gate having inputs $x_0\ \bar{x}_1\ x_2$ is needed while among the $B_j$ gates, a gate having inputs $x_3\ \bar{x}_4\ \bar{x}_5$ is needed. The gates meeting these conditions are $A_5$ and $B_1$. The emitter of transistor $Q_5$ is at a high voltage potential while the emitters of all the other "Q" transistors are at ground potential.

The collectors of all the "P" transistors are at $+v_1$ potential until all their emitters are pulsed by the constant current regulator 47. At that time, the collector potential of transistor $P_1$ for gate $B_1$ drops and current flows through the selected line $13_x$. Current cannot flow through the other lines because of the reverse bias on diodes $0_d$ to $63_d$ in these lines. The current flowing in the selected lines is regulated by constant current regulator 47 shown in greater detail in FIG. 6.

The object of constant current regulator 47 is to provide a constant current across matrix 45 regardless of transistor drift, voltage variations, resistance drift and other factors which might cause errors. Upon the application of a pulse voltage $v_1$ to the system, a voltage is to drop across resistor $R_e$, and the current $\downarrow I_{R_e}$ is to be constant. This constant current $\downarrow I_{R_e}$ will be dropped across resistor $R_e$ by a switching PNP transistor $T_1$ between the matrix load 45 and resistor $R_e$. Transistor $T_1$ will act because it is driven by an emitter follower pair of transistors, i.e., NPN transistor $T_2$ and PNP transistor $T_4$. The pulse voltage $v_1$ is applied to the base of NPN transistor $T_4$. The emitter of transistor $T_4$ is connected to Zener diode $Z_z$ across resistor $R_z$, the collector of transistor $T_4$ is at a negative potential $-v_{ee}$ across a resistor $R_{c_4}$, and acts on the base of transistor $T_2$ across resistor $R_{b_2}$ supplying bias current $I_{b_2}$ to the base of $T_2$. Zener diode $Z_z$ and its resistor $R_z$ are connected to the base of another PNP transistor $T_3$ so that the base and collector of transistor $T_3$ are in parallel with Zener diode $Z_z$ and there being a voltage drop $v_z$ across the Zener diode. The emitter of PNP transistor $T_3$ is connected to the base of NPN transistor $T_2$ between the base of $T_2$ and base bias resistor $R_{b_2}$ so that the emitter and base of PNP transistor $T_3$ are in parallel with PNP transistor $T_4$ and resistor $R_z$. NPN transistor $T_2$ with its base connected to resistor $R_{b_2}$ and the emitter of PNP transistor $T_3$ has its collector connected to a plus potential $v_{cc}$ across bias collector resistor $R_{c_2}$ and its emitter is connected to the constant current resistor $R_e$. Constant current resistor $R_e$ is acted on by both the emitter of NPN transistor and the collector of PNP transistor $T_1$ on the one side and the collector of transistor $T_3$ on the other side. The current $I_{R_e}$ across resistor $R_e$ will be supplied from the matrix load 45 which passes current $I_L$ across the emitter and collector of transistor $T_1$ and across resistor $R_e$. Transistor $T_1$ is clamped fix by diodes $F_1$ and $F_2$ between the emitter and base.

Under quiescent conditions, all transistors are off and the transistor $T_1$ is back biased. No current flows through the load. The Zener diode $Z_z$ is broken down by current flowing from $v_1$ through it and resistor $R_z$ into the negative supply $-v_{ee}$. Transistor $T_3$ isolates the Zener during steady state and also insures that the change of current through the Zener during pulse time is negligible. Upon the application of the pulse to the base of $T_4$, all transistors in the driver circuit become conducting. The magnitude of the output current flowing through the load is determined solely by the resistor $R_e$ and the Zener voltage $v_z$. In this circuit for a 100° C. change in temperature, the current through the load changes only by 0.06% approximately.

The effective impedance seen by the load is very high. For in addition to the resistor $R_e$, the load sees the impedance of a non-saturated transistor $T_1$. The collector of the latter is clamped to a fixed potential equal to $(v_{ee}-v_z)$ by diodes $F_1$ and $F_2$ while the potential of the emitter is equal to the load potential minus the $I_R$ drop across the load.

The relationship of the load current to the supply voltage, current gain and transistor base-emitter voltages may perhaps be better understood if we consider $B_1$ the current gains in transistor $T_1$ and $B_2$ the current gains in transistors $T_2$, then $$I_{R_e}=I_L+I_{R_{c_2}}+I_{b_2}$$

$$=I_L+I_{R_{c_2}}+\frac{(I_{R_{c_2}}+I_{b_1})}{B_2}$$

$$\approx I_L+I_{R_{c_2}}+\frac{I_L}{(B_1+1)(B_2)}$$

$$\approx I_L+I_{R_{c_2}}$$

Therefore, is independent of $$B_1 \text{ or } B_2,\ I_{R_{c_2}}$$

is typically much smaller than $$I_L\left(\simeq\frac{1}{300}I_L\right)$$

Its variation with supply voltage $v_{cc}$ and other less significant parameters can, therefore, be neglected when calculating load current variations. No significant error will result if in the calculations we neglect completely $$I_{R_{c_2}}$$

Therefore, $$I_{R_e}=I_L$$

$$I_{R_e}=\frac{v_e-(-v_{ee})}{R_e}=I_L$$

$$v_e=-v_{ee}+v_z+v_{be_3}-v_{be_2}$$

Denoting $v_{be_3}-v_{be_2}$ by $\Delta v_{be}$ $$I_L=\frac{v_z+\Delta v_{be}}{R_e}$$

(where $$v_{be_3} \text{ and } v_{be_2}$$

are the voltage drops across $T_2$ and $T_3$).

Assuming typical values of −12 volts and +4.0 volts for $v_{ee}$ and $v_1$ respectively, a 12 volt Zener could be chosen for $Z_z$ with a voltage temperature coefficient of .0002% per 1° C. The effect of its finite impedance can be neglected since the current change through it is negligible.

$T_2$ and $T_3$ could readily be chosen to track one another within 50μ v./1° C. (the current level of $T_3$ can be selected, for best tracking, by choosing the proper value of $R_{b_2}$). Thus, for a 100° C. change in temperature the percentage change in load current will be $$100\left[\frac{\left(\frac{.0002\times 12}{100}\right)+50\times 10^{-6}}{12}\right]\times 100=0.062\%$$

It is to be observed, therefore, that the present invention provides for an NDRO memory of the *x-y* coincident-current magnetic core memory matrix type wherein a reset winding is coupled only to those cores which are to be read out with a signal during the read-out sequence and, if a plurality of programs are to be stored in the memory, a plurality of reset windings are provided, each winding separately contacting only those cores which are to provide a signal during the read-out sequence, each winding including separate enabling means. The present invention also provides for a method of storing one or more programs into an *x-y* coincident-current magnetic core matrix, comprising the steps of coupling one reset winding for each program to each one of selected cores which are to provide a signal during the program read out and skipping those cores which are not to provide a signal during the program read out, enabling said selected cores with the particular winding for said program, reading out said matrix and repeating the step of enabling said selected cores. To provide a better signal-to-noise ratio, a bias current can also be supplied through the reset winding, preferably of the order of one-third of the full switching current.

Furthermore, the present invention contemplates driving the magnetic core matrix by *x* and *y* selection matrices, each selection matrix being used to select one of the *x* and *y* lines of the memory matrix, and each selection matrix including a flip-flop address register, each flip-flop of the register acting on the bases of transistor AND gates, the enabling of two of which select the desired line. The selection matrix serves as a load of a constant current driver, all the emitters of the transistor AND gates being connected to said driver. Upon the application of a pulse to the driver, the current is supplied to switch the cores.

The constant current driver has a switching transistor, the emitter of which is connected to the emitters of all the transistor AND gates, the collector of which is connected to a load resistor. The switching function is controlled by an emitter follower transistor pair acting on the base of the switching transistor. The current variations in the switching transistor and emitter follower transistor pair are equalized by a Zener diode and its resistor in parallel with a complementary transistor to the emitter follower pair.

While there has been described what at present are believed to be the preferred embodiments of this invention, it will be obvious to those skilled in the art that various modifications can be made therein within the scope of the invention, and it is intended that the appended claims cover all such modifications.

What is claimed is:

1. A non-destructive read-out memory for storing a particular program therein, comprising in combination:

a matrix of magnetic cores with *x* and *y* lines driver windings therethrough to provide coincident current;

a reset winding through said matrix, said reset winding being coupled only to those cores to be read out for said program and including separate enabling means;

*x* and *y* selection matrices to select one of the *x* and *y* lines of the memory matrix, each selection matrix including a flip-flop address register, transistor AND gates acted on by said address register flip-flops, the enabling of two AND gates serving to select one of said *x* and *y* lines; and a constant-current driver connected to said transistor AND gates to apply a drive pulse thereto, including a switching transistor whose emitter is connected to said transistor AND gates, the collector of which is connected to a load resistor, an emitter follower transistor pair acting on the base of said switching transistor, the current variations in the switching transistor and emitter-follower pair being equalized by a Zener diode, and its resistor in parallel with a complementary transistor to the emitter-follower pair.

2. A memory as claimed in claim 1, for storing a plurality of programs therein, there being a plurality of separate reset windings, each separately being coupled to only those cores to be read out in each separate program and including separate enabling means for each reset winding.

References Cited

UNITED STATES PATENTS

| | | | |
|---|---|---|---|
| 3,215,992 | 11/1965 | Schallerer | 340—174 |
| 3,263,090 | 7/1966 | Blocher | 307—270 X |

JAMES W. MOFFITT, *Primary Examiner.*

U.S. Cl. X.R.

307—270, 318